United States Patent
Vijayan

(10) Patent No.: US 11,766,000 B2
(45) Date of Patent: Sep. 26, 2023

(54) GAS SENSING ASSEMBLY FOR AN INDOOR GARDEN CENTER

(71) Applicant: Haier US Appliance Solutions, Inc., Wilmington, DE (US)

(72) Inventor: Vineeth Vijayan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 156 days.

(21) Appl. No.: 17/359,757

(22) Filed: Jun. 28, 2021

(65) Prior Publication Data
US 2022/0408671 A1    Dec. 29, 2022

(51) Int. Cl.
*A01G 9/18*    (2006.01)
*A01G 9/24*    (2006.01)
*A01G 31/04*    (2006.01)

(52) U.S. Cl.
CPC .............. *A01G 9/18* (2013.01); *A01G 9/246* (2013.01); *A01G 31/04* (2013.01)

(58) Field of Classification Search
CPC .......... A01G 7/02; A01G 31/06; A01G 9/246; A01G 9/18; F15D 1/10
See application file for complete search history.

(56) References Cited

U.S. PATENT DOCUMENTS

| | | | |
|---|---|---|---|
| 8,381,576 B2 * | 2/2013 | Schlichte | G01N 27/16 73/31.06 |
| 8,915,121 B2 * | 12/2014 | Kumar | H01L 27/3225 73/31.03 |
| 8,952,331 B2 | 2/2015 | Takanori | |
| 9,974,243 B2 | 5/2018 | Martin | |
| 10,473,615 B2 | 11/2019 | Chung | |
| 2017/0049062 A1 * | 2/2017 | Van Such | A01G 29/00 |
| 2017/0099785 A1 * | 4/2017 | Zimmerman | A01G 9/18 |
| 2019/0302076 A1 | 10/2019 | Chen | |
| 2020/0352113 A1 * | 11/2020 | Canipe | A01G 9/20 |
| 2021/0307269 A1 * | 10/2021 | Massey | A01G 31/06 |
| 2022/0240458 A1 * | 8/2022 | Breza | A01G 7/045 |
| 2022/0248992 A1 * | 8/2022 | Grangeat | G01N 21/3504 |

FOREIGN PATENT DOCUMENTS

| | | |
|---|---|---|
| JP | 3860578 B2 | 12/2006 |
| KR | 20180114563 A | 10/2018 |

* cited by examiner

*Primary Examiner* — Joshua D Huson
*Assistant Examiner* — Katherine Anne Kloecker
(74) *Attorney, Agent, or Firm* — Dority & Manning, P.A.

(57) ABSTRACT

An indoor gardening appliance includes a liner defining a grow chamber and a grow module rotatably mounted within the grow chamber for receiving a plurality of plant pods. A recirculation duct is in fluid communication with the grow chamber and a fan assembly circulates a flow of air through the recirculation duct and the grow chamber. A gas sensing assembly includes a gas sensor positioned within the recirculation duct for detecting the concentration of a gas within the flow of air and a flow stabilization device at least partially surrounding the gas sensor for reducing pressure fluctuations in the flow of air and improving gas sensor accuracy.

17 Claims, 11 Drawing Sheets

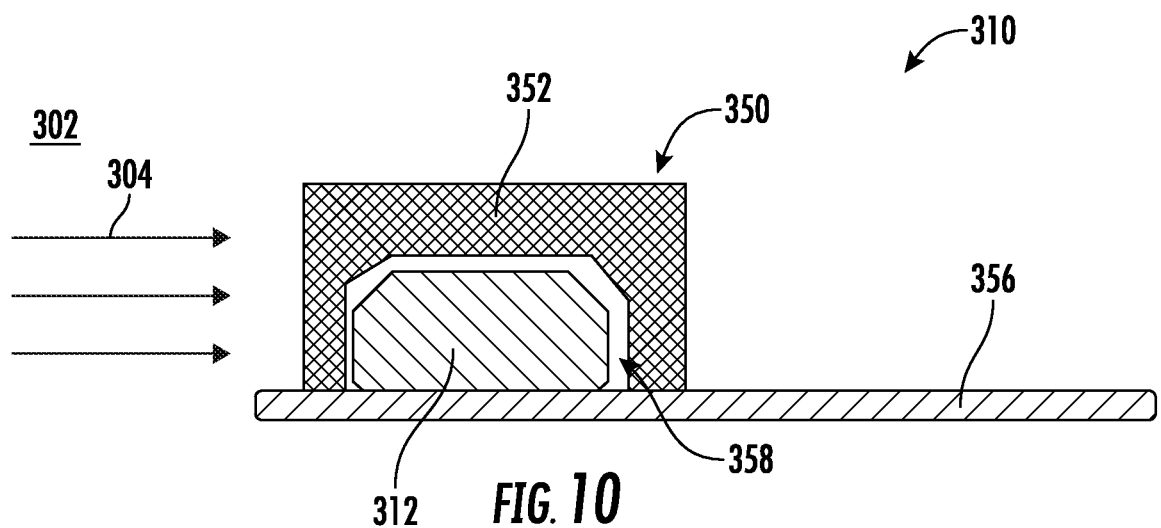
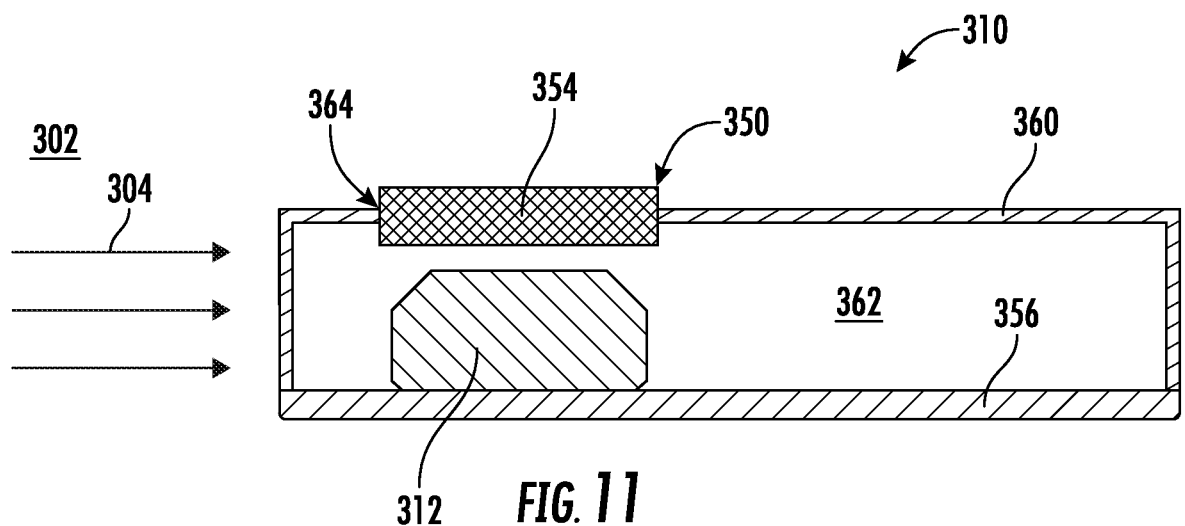

GAS SENSING ASSEMBLY FOR AN INDOOR GARDEN CENTER

FIELD OF THE INVENTION

The present subject matter relates generally to systems for gardening plants indoors, and more particularly, to a system and method for measuring the concentration of one or more gases in an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

As plants grow within the grow chambers of conventional indoor garden centers, they may give off, absorb, or otherwise affect the concentration or amount of particular gases within the grow chamber. For example, if left uncontrolled, growth of certain plants will result in an increase in the concentration of oxygen and ethylene, and a decrease in the concentration of carbon dioxide. These variations in gas concentrations can result in undesirable growth conditions for the plants, or in the case of excess ethylene, hastened ripening of food products. Conventional indoor garden centers may include gas sensors for monitoring the concentration of particular gases within the grow chamber. However, common gas sensors are prone to errors resulting from fluctuations in internal pressures or flow velocities, particularly when the gas sensor is located within an airflow stream.

Accordingly, an improved indoor garden center would be useful. More particularly, an indoor garden center with features that facilitate improved monitoring of gas concentrations within the grow chamber would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance is provided including a liner positioned within a cabinet and defining a grow chamber, a grow module mounted within the liner and defining a plurality of apertures for receiving one or more plant pods, a recirculation duct in fluid communication with the grow chamber, a fan assembly operably coupled to the recirculation duct for urging a flow of air through the recirculation duct, and a gas sensing assembly. The gas sensing assembly includes a gas sensor positioned within the cabinet for detecting a concentration of a gas within the flow of air and a flow stabilization device at least partially surrounding the gas sensor for reducing pressure fluctuations in the flow of air.

In another exemplary embodiment, a gas sensing assembly for an appliance is provided. The appliance includes a cabinet defining a chamber, a recirculation duct in fluid communication with the chamber, and a fan assembly operably coupled to the recirculation duct for urging a flow of air through the recirculation duct. The gas sensing assembly includes a gas sensor positioned within the cabinet for detecting a concentration of a gas within the flow of air and a flow stabilization device at least partially surrounding the gas sensor for reducing pressure fluctuations in the flow of air.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 10 provides a gas sensing assembly that may be used to detect gas concentrations within the exemplary gardening appliance of FIG. 1 according to an exemplary embodiment of the present subject matter.

FIG. 11 provides a gas sensing assembly that may be used to detect gas concentrations within the exemplary gardening appliance of FIG. 1 according to an exemplary embodiment of the present subject matter.

Figure 1:
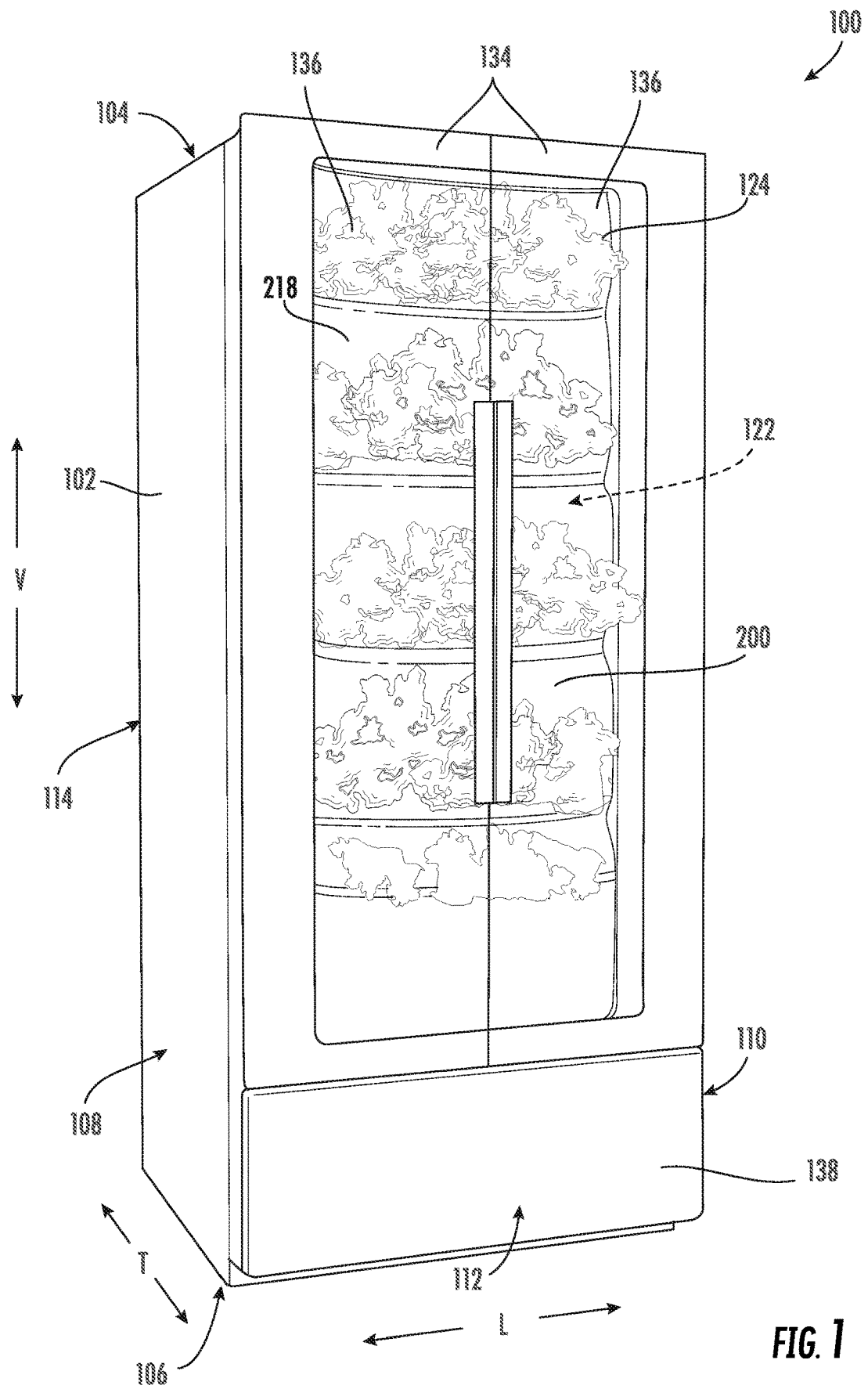
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
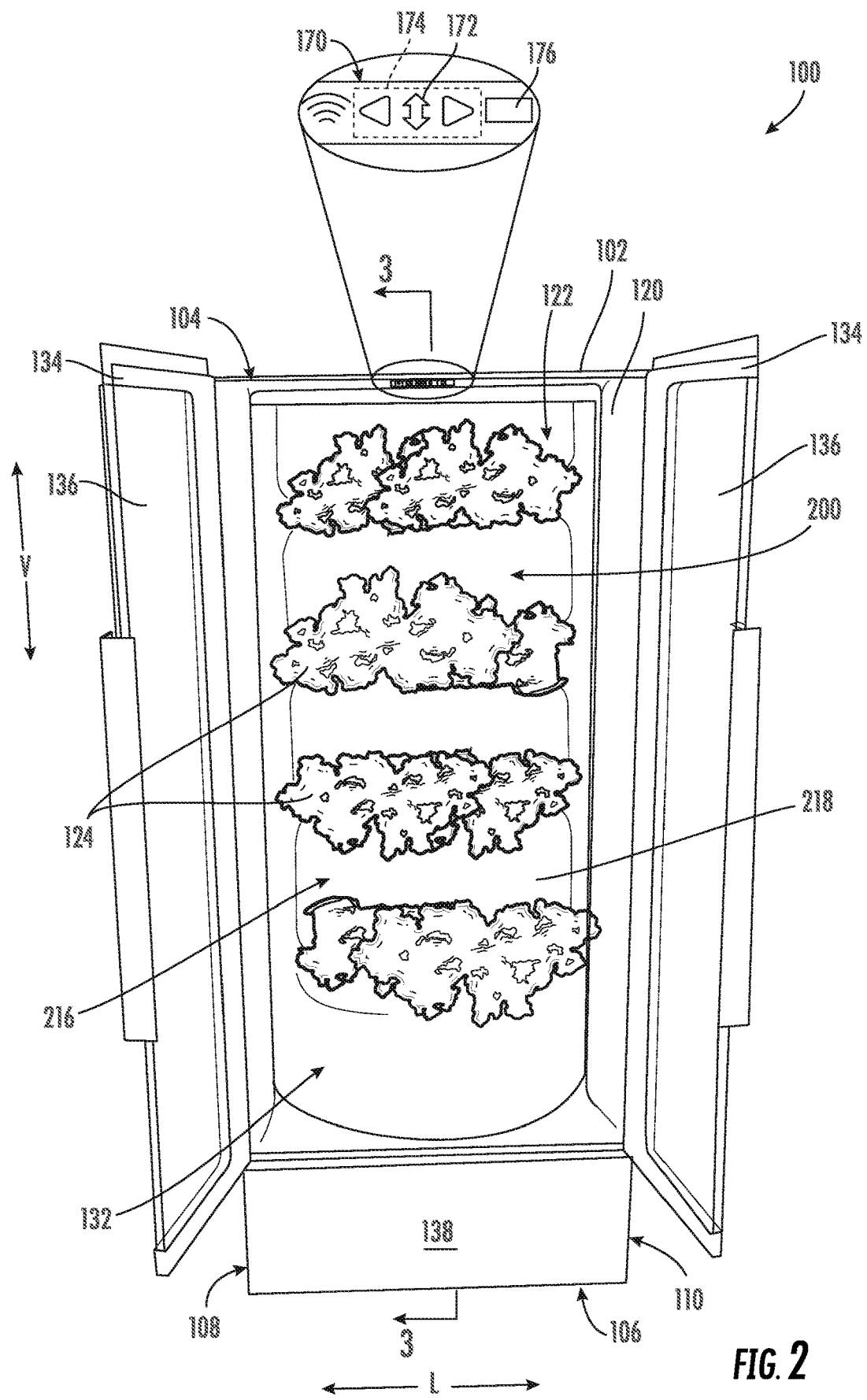
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
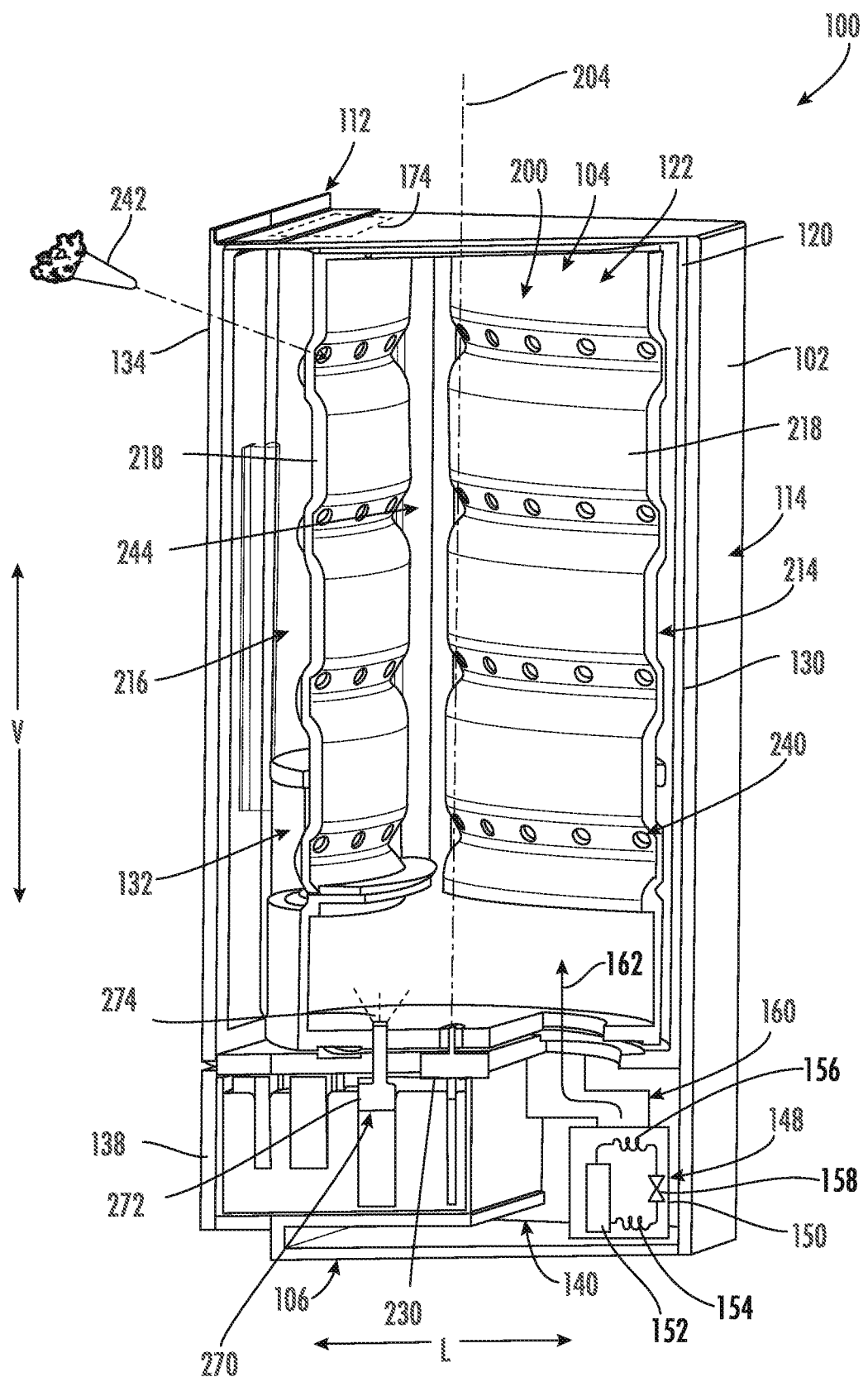
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 270, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
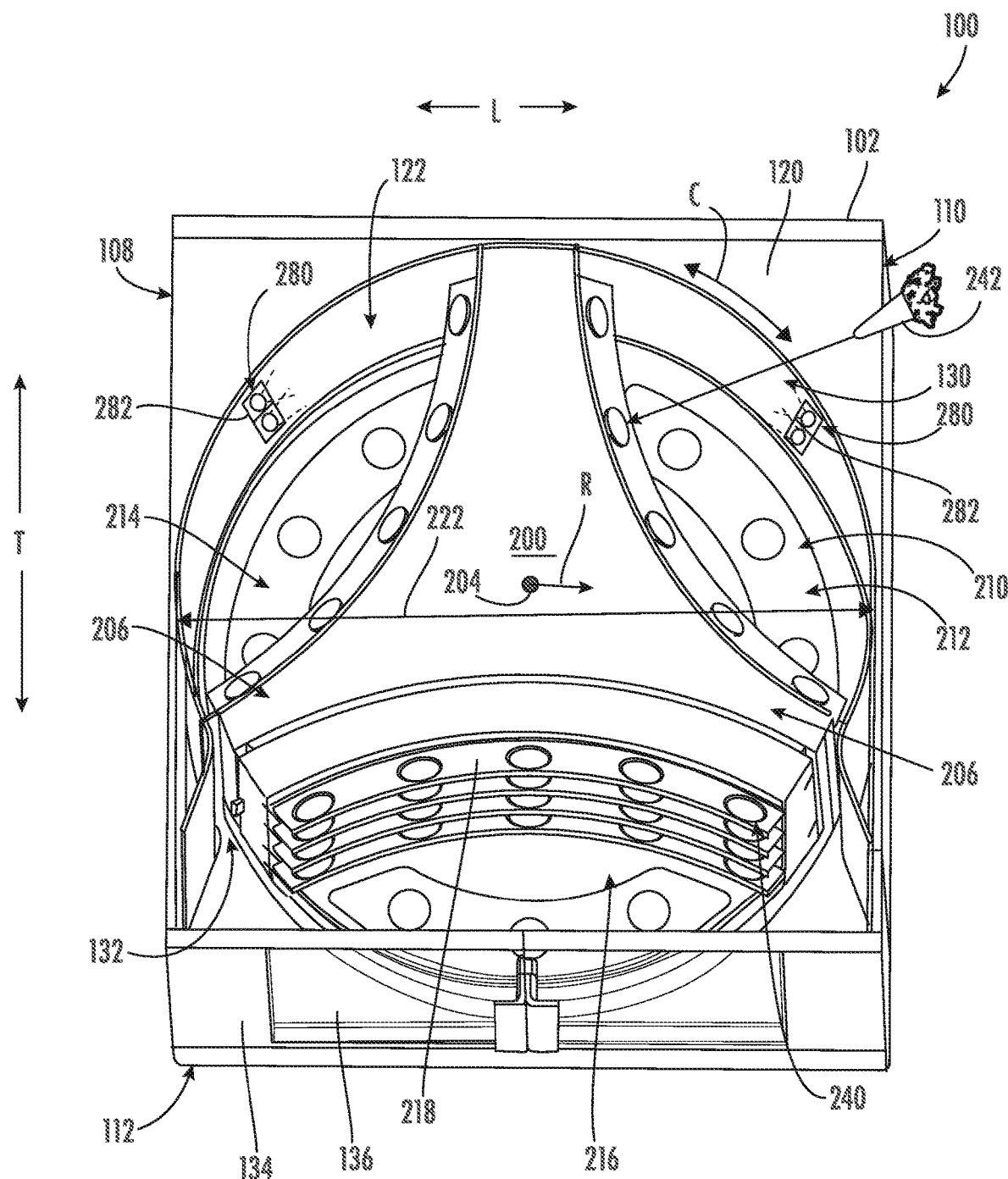
FIG. 4 is a top perspective view of the exemplary gardening appliance of FIG. 1, with the top panel of the cabinet removed to reveal a rotatable grow module according to an exemplary embodiment of the present subject matter.
Figure 5:
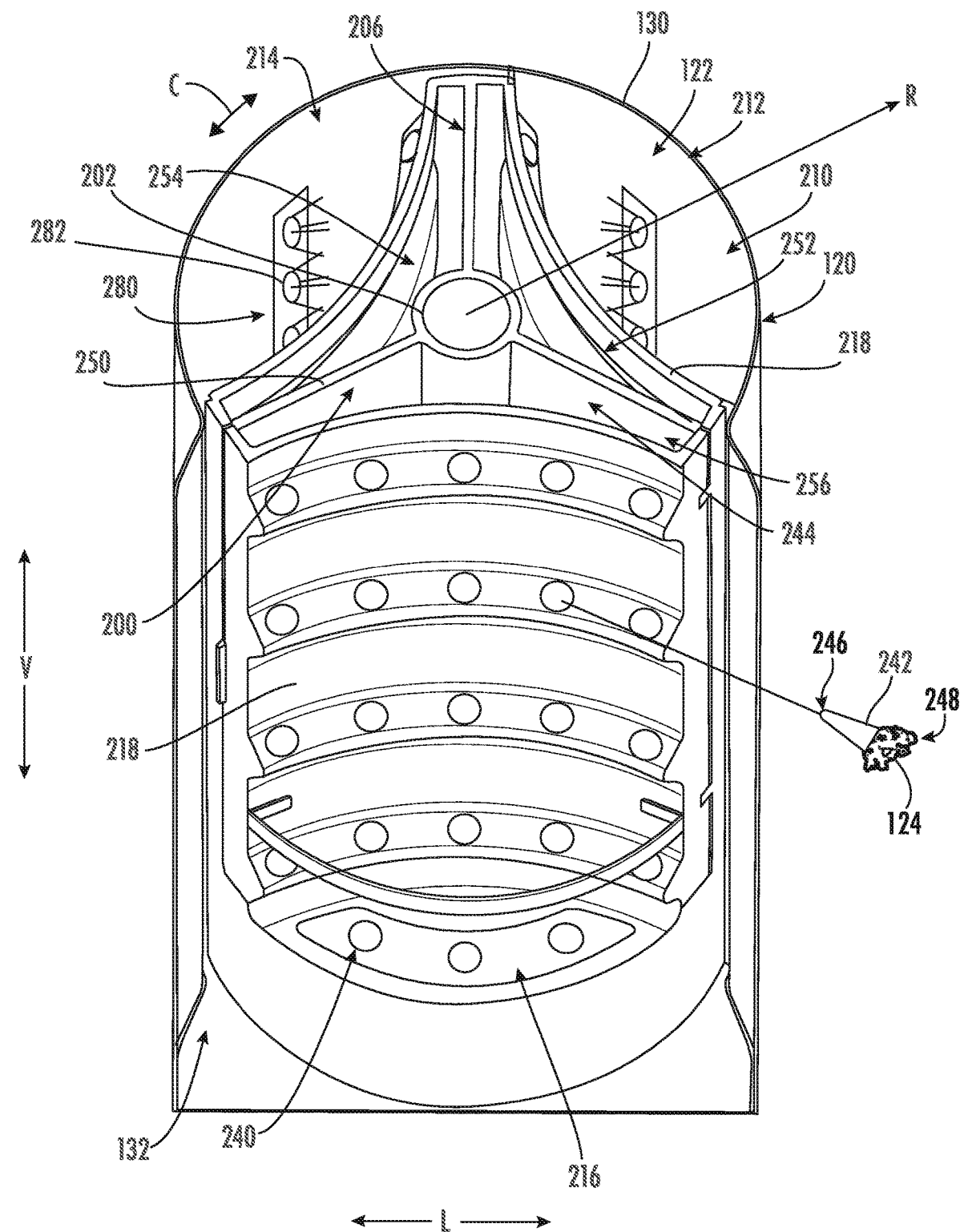
FIG. 5 provides a perspective cross sectional view of the exemplary gardening appliance of FIG. 1 according to another exemplary embodiment of the present subject matter.
Figure 6:
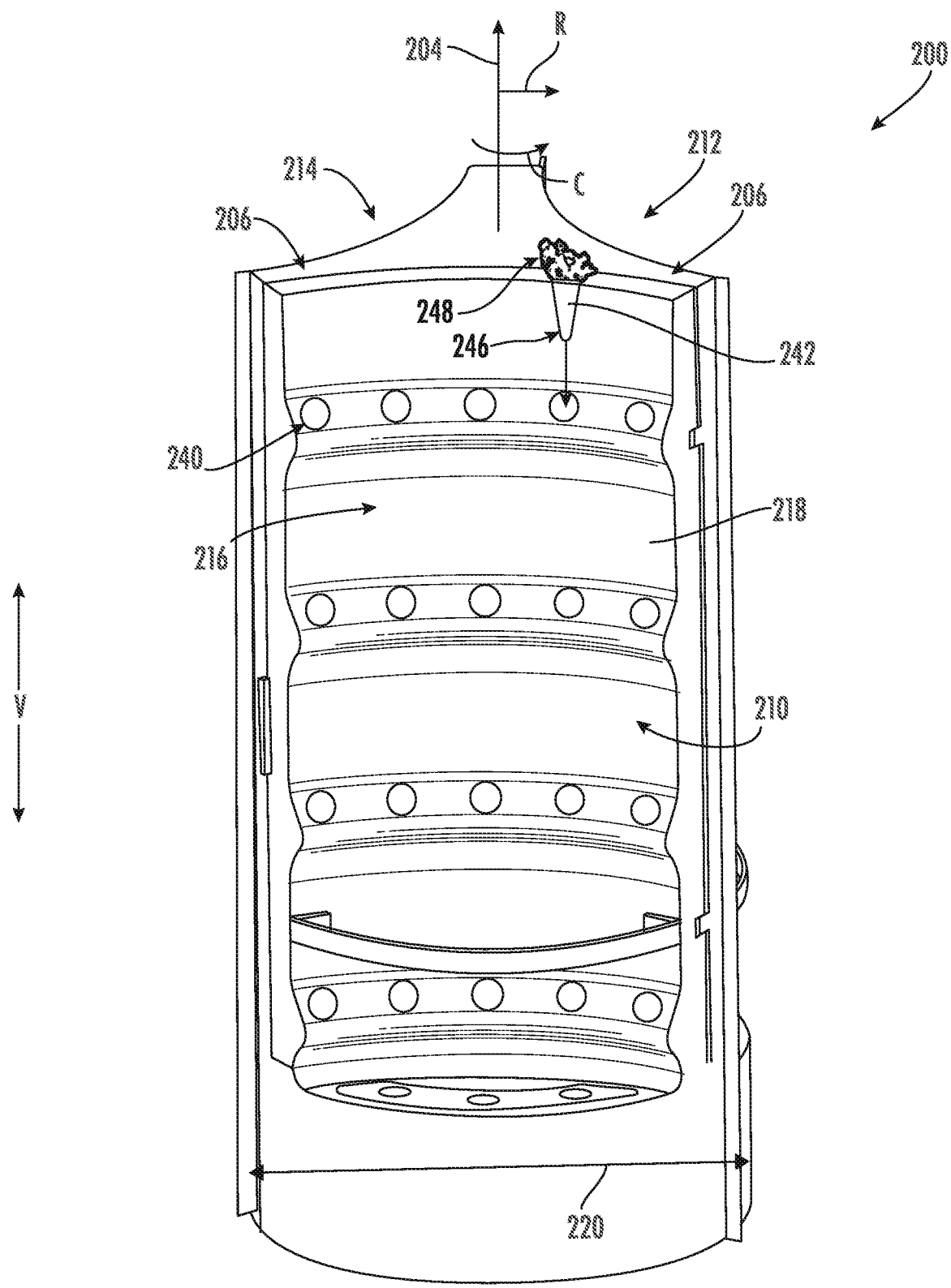
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
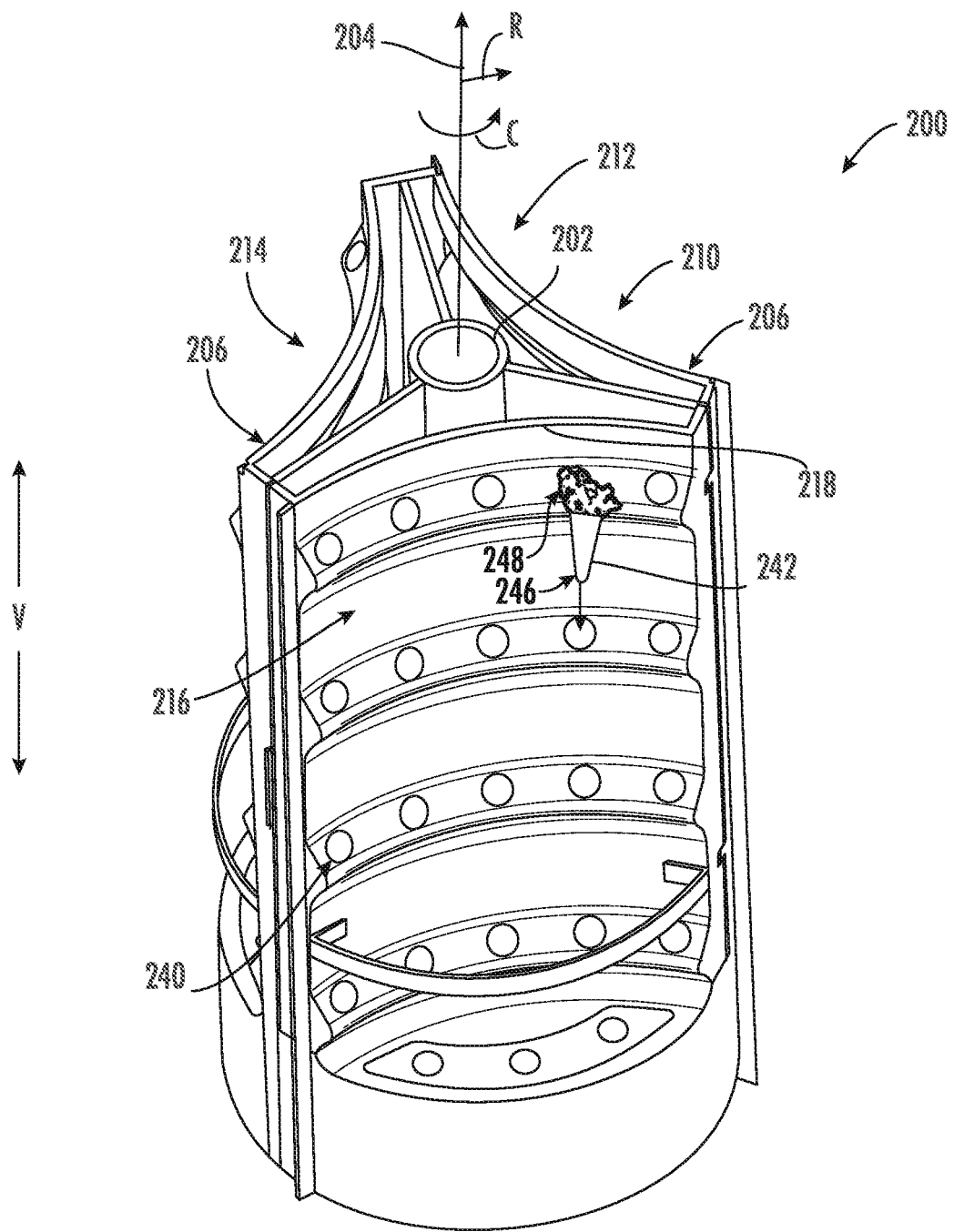
FIG. 7 provides a perspective cross sectional view of the exemplary grow module of FIG. 6 according to another exemplary embodiment of the present subject matter.
Figure 8:
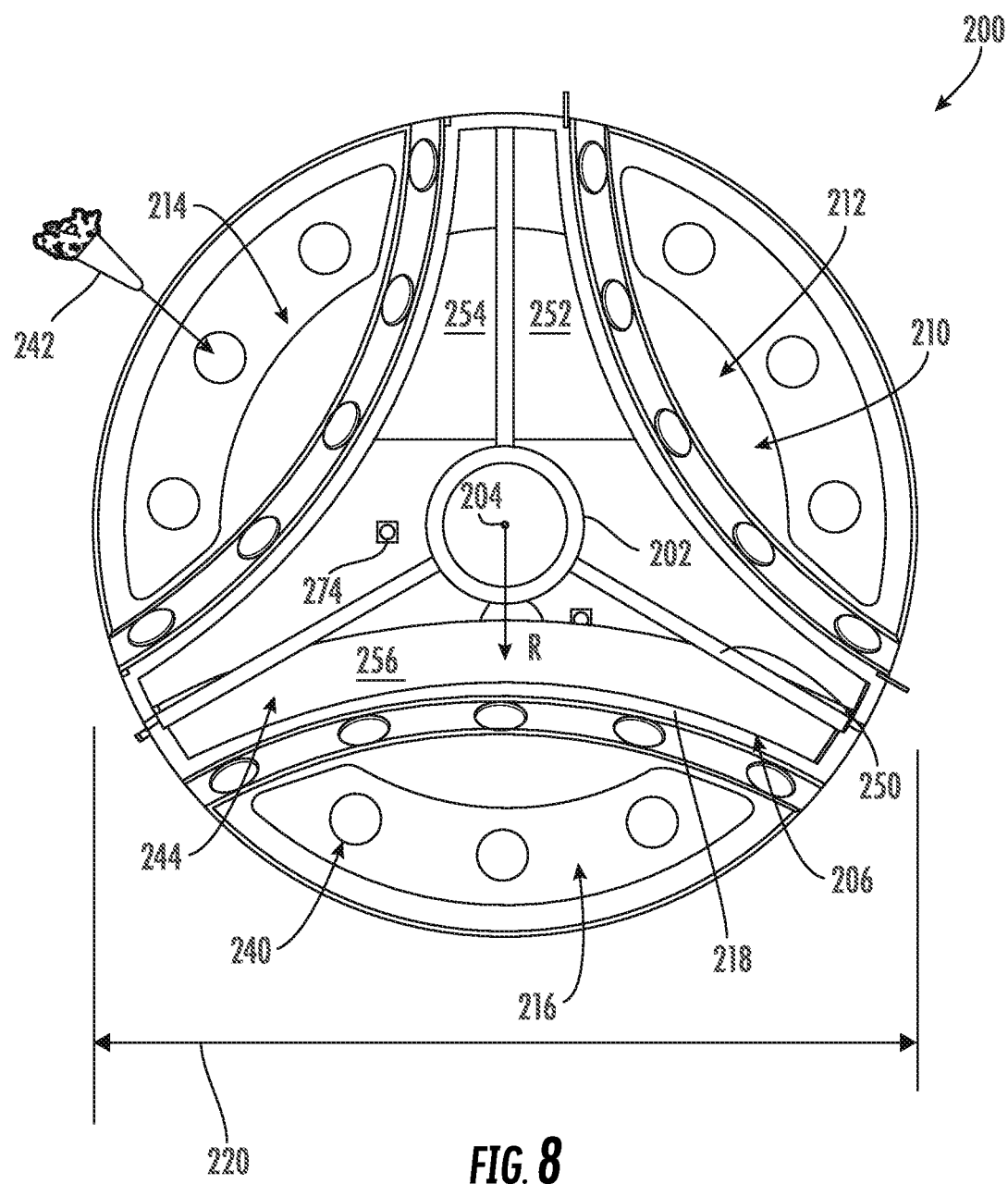
FIG. 8 provides a top cross-sectional view of the exemplary grow module of FIG. 6 according to another exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

Environmental control system 148 may further include a hydration system 270 which is generally configured for providing water to plants 124 to support their growth. Specifically, according to the illustrated embodiment, hydration system 270 generally includes a water supply 272 and misting device 274 (e.g., such as a fine mist spray nozzle or nozzles). For example, water supply 272 may be a reservoir containing water (e.g., distilled water) or may be a direct connection municipal water supply. Misting device 274 may be positioned at a bottom of root chamber 244 and may be configured for charging root chamber 244 with mist for hydrating the roots of plants 124. Alternatively, misting devices 274 may pass through central hub 204 along the vertical direction V and periodically include a nozzle for spraying a mist or water into root chamber 244. Because various plants 124 may require different amounts of water for desired growth, hydration system 270 may alternatively include a plurality of misting devices 274, e.g., all coupled to water supply 272, but being selectively operated to charge each of first root chamber 252, second root chamber 254, and third root chamber 256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Referring now for example to FIGS. 4 and 5, gardening appliance 100 may further include a light assembly 280 which is generally configured for providing light into selected grow chambers 210 to facilitate photosynthesis and growth of plants 124. As shown, light assembly 280 may include a plurality of light sources 282 stacked in an array, e.g., extending along the vertical direction V. For example, light sources 282 may be mounted directly to liner 120 within grow chamber 122, or may alternatively be positioned behind liner 120 such that light is projected through a transparent window or light pipe into grow chamber 122. The position, configuration, and type of light sources 282 described herein are not intended to limit the scope of the present subject matter in any manner.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

As explained above, light generated from light assembly 280 may result in light pollution within a room where gardening appliance 100 is located. Therefore, aspects of the present subject matter are directed to features for reducing light pollution, or to the blocking of light from light sources 282 through front display opening 132. Specifically, as illustrated, light assembly 280 is positioned only within the enclosed back portion 130 of liner 120 such that only grow chambers 210 which are in a sealed position are exposed to light from light sources 282. Specifically, grow module 200 acts as a physical partition between light assemblies 280 and front display opening 132. In this manner, as illustrated in FIG. 5, no light may pass from first chamber 212 or second chamber 214 through grow module 200 and out front display opening 132. As grow module 200 rotates, two of the three grow chambers 210 will receive light from light assembly 280 at a time. According still other embodiments, a single light assembly may be used to reduce costs, whereby only a single grow chamber 210 will be lit at a single time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Figure 9:
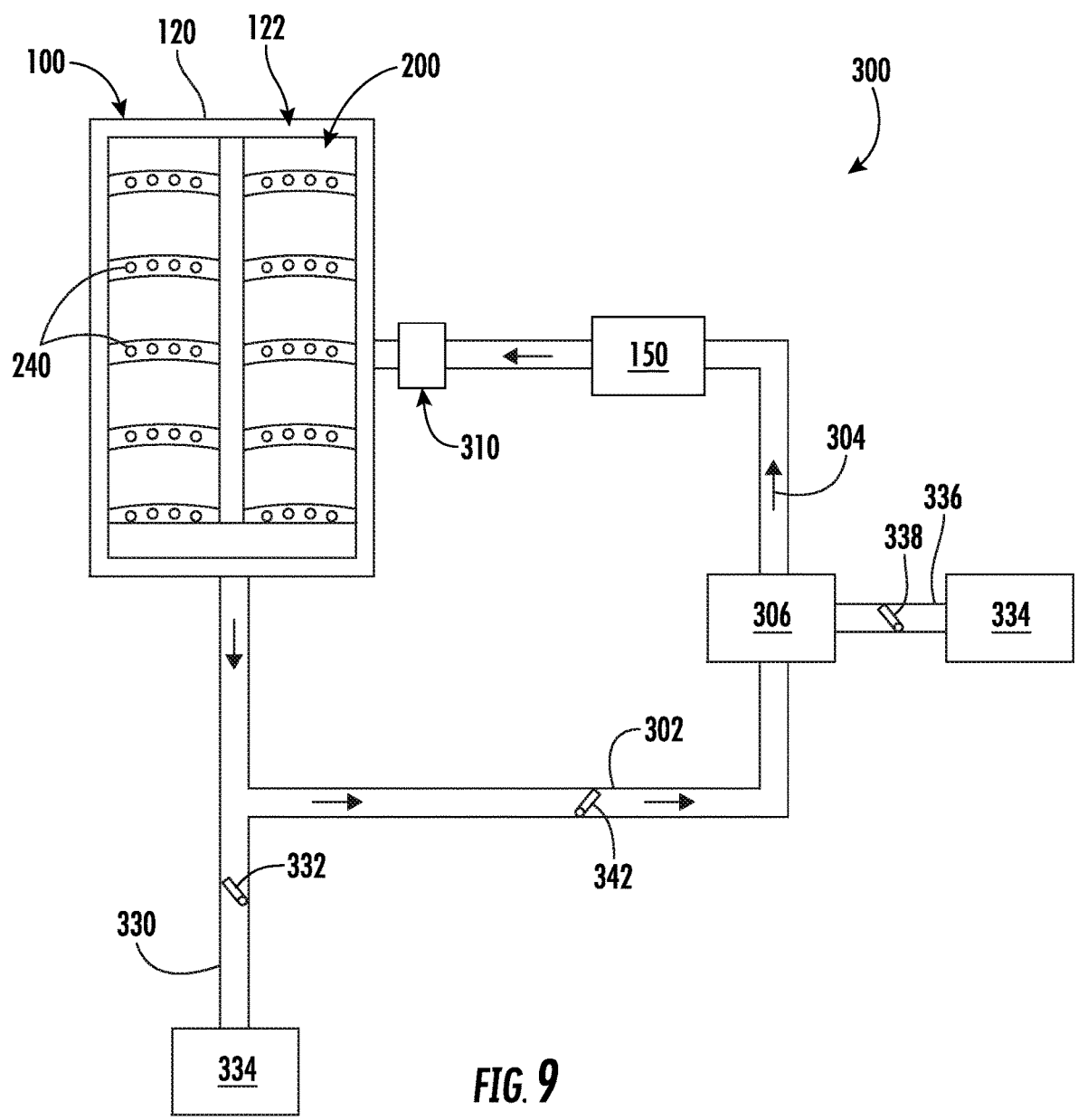
FIG. 9 provides a schematic view of an air circulation system that may be used with the exemplary gardening appliance of FIG. 1 according to an exemplary embodiment of the present subject matter.

Referring now specifically to FIG. 9, an air circulation system 300 will be described according to an exemplary embodiment of the present subject matter. In general, air circulation system 300 may be used to regulate air quality characteristics of a flow of air within grow chamber 122. For example, continuing example from above, air circulation system 300 may be a part or subsystem of environmental control system 148 of gardening appliance 100. Although air circulation system 300 is described herein in the context of gardening appliance 100, it should be appreciated that aspects of the present subject matter may be used to regulate air quality characteristics in any other gardening appliance or in any other application where it is desirable to regulate gas concentrations or other flow characteristics of a flow of air.

In general, air circulation system 300 includes a recirculation duct 302 that is in fluid communication with grow chamber 122 for removing, supplying, or recirculating the flow of air (e.g., identified generally herein by reference numeral 304). In addition, air circulation system 300 includes a fan assembly 306 that is operably coupled to recirculation duct 302 for urging the flow of air 304 through recirculation duct 302. In general, the fan assembly 306 may be any flow regulating device that is configured for recirculating or urging a flow of air. For example, the fan assembly 302 may include one or more axial fans, centrifugal fans, etc. In addition, the fan assembly 306 may be positioned at any suitable location on recirculation duct 302 or otherwise in fluid communication with recirculation duct 302.

As mentioned briefly above, air circulation system 300 may be generally configured for monitoring and/or regulating gas concentrations within the flow of air 304. In this regard, according to an exemplary embodiment, air circulation system 300 includes a gas sensing assembly 310 that is positioned within gardening appliance 100 for sensing gas concentrations or other quantitative or qualitative characteristics of flow of air 304. For example, growth of plants 124 may result in the build-up of oxygen and the depletion or consumption of carbon dioxide within grow chamber 122. Thus, according to an exemplary embodiment, gas sensing assembly 310 may include features, elements, or structures for improved monitoring of gas concentrations within the flow of air 304 to facilitate improved regulation and control, e.g., using a system of dampers, sealed system 150, etc.

In order to monitor the concentration or level of a particular gas or gases within the flow of air 304, gas sensing assembly 310 may include a gas sensor 312 (see, e.g., FIGS. 10 through 13) that is positioned within the flow of air 304. For example, gas sensor 312 may be positioned within recirculation duct 302, though any other suitable position of the gas sensor 312 may be used according to alternative embodiments. For example, gas sensing assembly 310 may be positioned within grow chamber 122 or at any other suitable location within gardening appliance 100. A controller, such as controller 174 of gardening appliance 100, may be in operative communication with gas sensor 312, fan assembly 306, gas sensing assembly 310, and other portions of gardening appliance 100 to monitor and/or regulate gas concentrations of the flow of air 304. Specifically, for example, controller 174 may obtain a concentration of a particular gas, such as carbon dioxide, using gas sensor 312. Controller 174 may then operate fan assembly 306, sealed system 150, or other system components to adjust the concentration of carbon dioxide within the flow of air 304.

As mentioned above, gas sensor 312 may be any type of sensor suitable for measuring carbon dioxide within the flow of air 304. For example, gas sensor 312 may include one or more non-dispersive infrared sensors, photoacoustic sensors, electrochemical sensors, or metal-oxide semiconductor sensors. Although the description herein refers to the use of gas sensing assembly 310 to monitor and control carbon dioxide concentration levels, it should be appreciated that according to alternative embodiments gas sensing assembly 310 may monitor any other suitable gas concentrations or flow characteristics.

As noted above, air circulation system 300 may be a subsystem or a part of environmental control system 148 of gardening appliance 100. Thus, air circulation system 300 may include other features for manipulating other flow characteristics, drawing in air or a particular gas from another source, discharging air, etc. For example, gardening appliance 100 may further include an ambient air ducting system for flushing ambient air through gardening appliance 100. Specifically, according to the illustrated embodiment, gardening appliance 100 includes an outlet vent duct 330 that is in fluid communication with grow chamber 122. As illustrated, outlet vent duct 330 is fluidly coupled to recirculation duct 302 upstream of gas sensing assembly 310 and fan assembly 306. In addition, an outlet vent damper 332 may be operably coupled to outlet vent duct 330 for selectively routing the flow of air 304 through an outlet vent duct 330. According to the illustrated embodiment, outlet vent duct 330 is fluidly coupled to the ambient environment 334. In this manner, air circulation system 300 or indoor gardening appliance 100 may periodically discharge some or all air from within grow chamber 122.

Similarly, according to the illustrated embodiment, gardening appliance 100 includes an inlet vent duct 336 that is in fluid communication with grow chamber 122. As illustrated, inlet vent duct 336 is fluidly coupled to fan assembly 306 or otherwise coupled upstream of fan assembly 306 relative to grow chamber 122. In addition, an inlet vent damper 338 may be operably coupled to inlet vent duct 336 for selectively routing the flow of air 304 through inlet vent duct 336. According to the illustrated embodiment, inlet vent duct 336 is fluidly coupled to the ambient environment 334. In this manner, air circulation system 300 or indoor gardening appliance 100 may periodically draw in ambient air, e.g., to flush the air within grow chamber 122.

Although outlet vent damper 332 and inlet vent damper 338 are described as being moved from an open position to a closed position, it should be appreciated that dampers 332, 338 may be moved to an intermediate position to recirculate some air while permitting the rest of the air to flow to ambient environment 334. It should be appreciated that according to alternative embodiments, other ambient air ducting systems may be used to draw in fresh air and discharge air from within grow chamber 122, and indoor gardening appliance 100 may further include any suitable fan assemblies or flow regulating devices for achieving such an inflow of fresh air.

In addition, recirculation duct 302 may be fluidly coupled to sealed system 150 for regulating the temperature, humidity, or other flow characteristics of air within grow chamber 122. According to the illustrated embodiment, air circulation system 300 includes a recirculation damper or a sealed system damper 342 for selectively coupling recirculation duct 302 with sealed system 150 and grow chamber 122, such that the flow of air 304 passes through sealed system 150. In this manner, indoor gardening appliance 100 may regulate any suitable characteristics of the flow of air 304, such as gas concentrations, temperature, humidity, etc. It should be appreciated that air circulation system 300 may have different duct systems, flow regulation devices, reactive assemblies, air supply sources, and other features while remaining within the scope of the present subject matter.

Referring now specifically to FIGS. 10 through 13, gas sensing assembly 310 will be described in more detail according to exemplary embodiments of the present subject matter. More particularly, as explained briefly above, gas sensing assemblies that include gas sensors positioned in locations where they are exposed to pressure variation or fluctuation may result in excessive sensor noise and/or errors. As such, the embodiments of gas sensing assemblies 310 illustrated and described herein may include features for reducing sensor noise or erroneous readings that result from fluctuating pressures or variances within an airflow. It should be appreciated that the gas sensing assemblies 310 described herein are only exemplary and are not intended to limit the scope of the present subject matter in any manner. In addition, it should be appreciated that like reference numerals may be used to refer to the same or similar features among embodiments.

As explained above, each gas sensor assembly 310 may include a gas sensor 312 that is positioned within gardening appliance 100 for detecting a concentration of gas within the flow of air 304. For example, according to the illustrated embodiment (see, e.g., FIG. 9), gas sensing assembly 310 is positioned within recirculation duct 302 directly in flow of air 304. However, it should be appreciated that according to alternative embodiments, gas sensing assembly 310 may be positioned at any other suitable location for measuring gas concentrations, e.g., such as within grow chamber 122, within outlet vent duct 330, etc.

As illustrated, gas sensing assembly 310 may further include a flow stabilization device 350 that at least partially surrounds gas sensor 312. In this manner, for example, flow stabilization device 350 may reduce pressure fluctuations experienced by gas sensor 312, resulting in more accurate and less noisy gas concentration measurements. It should be appreciated that flow stabilization device 350 may have any suitable construction for damping or reducing pressure fluctuations. Only exemplary constructions are described herein, but the scope of the present subject matter is not intended to be limited to such exemplary embodiments.

According to the embodiments illustrated in FIG. 10, flow stabilization device 350 may include a porous open cell foam 352. In this regard, the porous open cell foam 352 may be formed in any suitable manner and may have any suitable porosity for damping pressure fluctuations experienced by gas sensor 312. For example, according to exemplary embodiments, the porous open cell foam 352 is formed from at least one of polyurethane, neoprene, ethylene propylene diene monomer, natural gum, or metal foam. According to still other embodiments, the flow stabilization device 352 may include a porous packing material 354 of at least one of glass fiber, zeolite, nylon, or fluorine resin and/or may otherwise include a perforated plate, a mesh screen, etc.

Referring still to FIGS. 10 and 11, flow stabilization device 350 may be mounted onto or over a sensor control board 356. In this regard, sensor control board 356 may be any suitable electronics board, such as a printed circuit board, upon which gas sensor 312 may be mounted and through which gas sensor 312 may communicate with controller 174. As illustrated in FIG. 10, porous open cell foam 352 completely surrounds gas sensor 312. In this regard, porous open cell foam 352 may be mounted directly to sensor control board 356 and may define an internal void 358 that completely encapsulates gas sensor 312. In this manner, any portion of the flow of air 304 that reaches gas sensor 312 has passed through the porous open cell structure.

By contrast, as illustrated in FIG. 11, gas sensing assembly 310 may include a sensor housing 360 that is positioned partially or entirely around gas sensor 312 and/or sensor control board 356. As such, sensor housing 360 defines a sensing chamber 362 within which gas sensor 312 is mounted. As illustrated, sensor housing 360 further defines an aperture 364 through which the flow of air 304 may pass into sensing chamber 362. According to the illustrated embodiment, porous packing material 354 is positioned over aperture 364 such that the flow of air 304 passes through porous packing material 354 before reaching gas sensor 312. As illustrated, aperture 364 is defined on a side of sensor housing 360 relative to the direction of the flow of air 304. However, it should be appreciated that according to alternative embodiments, aperture 364 may be positioned at any other suitable location on sensor housing 360, e.g., such as the upstream surface or downstream surface of sensor housing 360.

Figure 12:
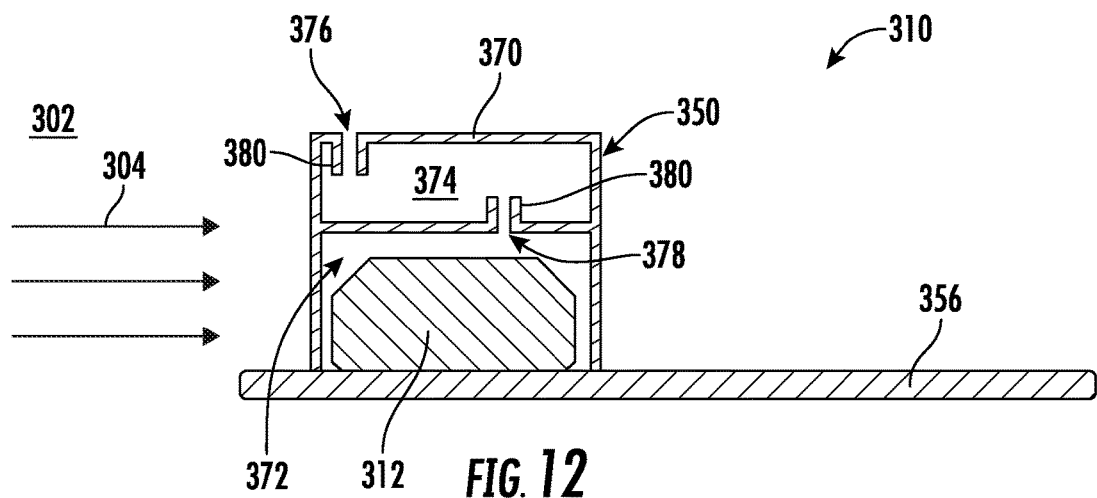
FIG. 12 provides a gas sensing assembly that may be used to detect gas concentrations within the exemplary gardening appliance of FIG. 1 according to an exemplary embodiment of the present subject matter.
Figure 13:
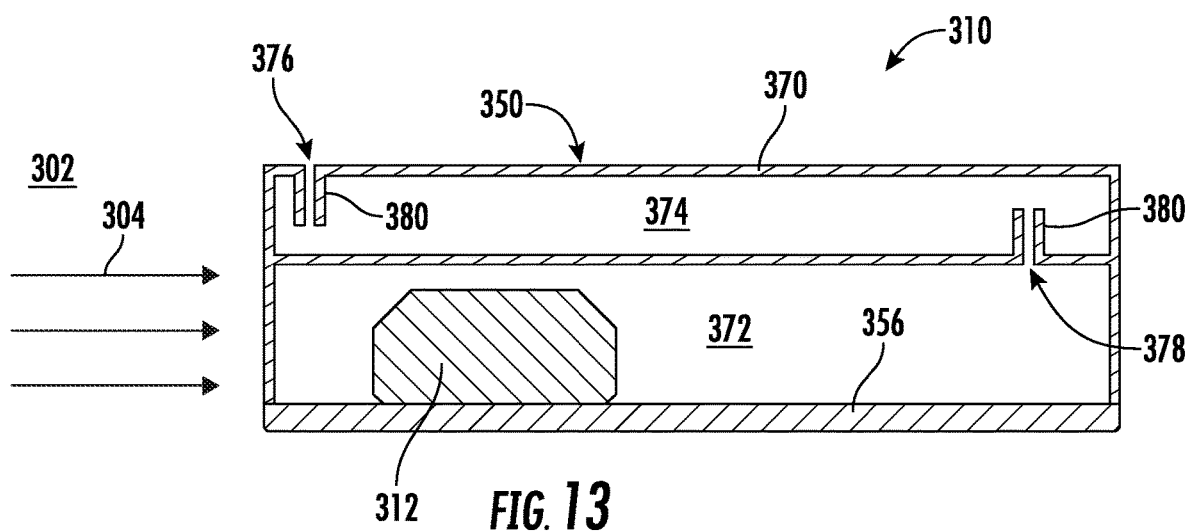
FIG. 13 provides a gas sensing assembly that may be used to detect gas concentrations within the exemplary gardening appliance of FIG. 1 according to an exemplary embodiment of the present subject matter.

Referring now to FIGS. 12 and 13, flow stabilization device 350 may further include muffler configurations or constructions for redirecting the flow of air 304 and damping pressure fluctuations for improved gas sensor operation.

Specifically, according to the illustrated embodiment, flow stabilization device 350 may include a muffler housing 370 that generally defines a sensing chamber 372 and an intermediate muffler chamber 374 that is in fluid communication with sensing chamber 372. According to the illustrated embodiment, gas sensor 312 is positioned within sensing chamber 372 and the flow of air 304 may only enter sensing chamber 372 after passing through intermediate muffler chamber 374.

Specifically, according to the illustrated embodiment, muffler housing 370 further defines a muffler inlet 376 that fluidly couples intermediate muffler chamber 374 to recirculation duct 302 and a muffler outlet 378 that fluidly couples intermediate muffler chamber 374 to sensing chamber 372. Thus, during operation, the flow of air 304 must first pass through muffler inlet 376 before entering intermediate muffler chamber 374. The flow of air 304 then traverses the length of muffler housing 370 to muffler outlet 378. The flow of air 304 then enters sensing chamber 372 through muffler outlet 378 before being detected by gas sensor 312. According to the illustrated embodiment, muffler inlet 376 is offset relative to muffler outlet 378 such that the flow of air 304 must pass along a length of muffler housing 370, thereby reducing pressure fluctuations.

Although muffler housing 370 as illustrated as covering only gas sensor 312 in FIG. 12 and enclosing the entire sensor control board 356 in FIG. 13, it should be appreciated that these are only exemplary embodiments and that the construction of muffler housing 370 may vary while remaining within scope the present subject matter. For example, although muffler housing 370 is illustrated as including a single intermediate muffler chamber 374, it should be appreciated that according to alternative embodiments muffler housing 370 may include multiple muffler chambers to provide a tortuous and elongated path for the flow of air 304 to reach gas sensor 312.

In addition, according to the illustrated embodiment, muffler housing 370 may further define one or more baffles 380 that are positioned over at least one of muffler inlet 376 or muffler outlet 378 that further reduce pressure fluctuations. For example, baffles 380 may generally extend into intermediate muffler chamber 374 in a direction perpendicular to the primary flow of air 304. In addition, it should be appreciated that intermediate muffler chamber may include one or more additional baffles positioned in the center of the structure for damping flow of air 304. Other structures are possible and within scope the present subject matter.

In general, the porous open cell foam 352, porous packing material 354, muffler housing 370, or other flow stabilization devices 350 may generally be configured for impeding the flow of air 304 as it reaches gas sensor 312. In this regard, these structures define indirect pathways through which the flow of air 304 may pass before reaching gas sensor 312. In this manner, pressure fluctuations are reduced and gas concentration measurements are stabilized and have improved accuracy.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
   a liner positioned within a cabinet and defining a grow chamber;
   a grow module mounted within the liner and defining a plurality of apertures for receiving one or more plant pods;
   a recirculation duct in fluid communication with the grow chamber;
   a fan assembly operably coupled to the recirculation duct for urging a flow of air through the recirculation duct; and a gas sensing assembly comprising:
  a gas sensor positioned within the cabinet for detecting a concentration of a gas within the flow of air; and
  a flow stabilization device surrounding the gas sensor for reducing pressure fluctuations in the flow of air, wherein the flow stabilization device comprises a muffler housing defining a sensing chamber and an intermediate muffler chamber, wherein the gas sensor is positioned within the sensing chamber, and wherein the muffler housing defines a muffler inlet that fluidly couples the intermediate muffler chamber to the recirculation duct and a muffler outlet that fluidly couples the intermediate muffler chamber to the sensing chamber.

2. The gardening appliance of claim 1, wherein the flow stabilization device comprises a porous open cell foam.

3. The gardening appliance of claim 2, wherein the porous open cell foam is formed from at least one of polyurethane, neoprene, ethylene propylene diene monomer, natural gum, or metal foam.

4. The gardening appliance of claim 1, wherein the flow stabilization device comprises a porous packing material of at least one of glass fiber, zeolite, nylon, or fluorine resin.

5. The gardening appliance of claim 1, wherein the flow stabilization device comprises a perforated plate or a mesh screen.

6. The gardening appliance of claim 1, wherein
  the flow stabilization device is a porous open cell foam positioned over an aperture of the housing.

7. The gardening appliance of claim 6, wherein the housing is a sensor board cover for enclosing a sensor control board, the gas sensor being mounted on the sensor control board.

8. The gardening appliance of claim 1, wherein the muffler inlet is offset relative to the muffler outlet.

9. The gardening appliance of claim 1, wherein the muffler housing defines one or more baffles positioned over at least one of the muffler inlet or the muffler outlet.

10. The gardening appliance of claim 1, wherein the muffler housing defines a plurality of intermediate muffler chambers.

11. The gardening appliance of claim 1, wherein the gas sensor is positioned within the recirculation duct.

12. The gardening appliance of claim 1, wherein the gas sensor is a carbon dioxide sensor.

13. A gas sensing assembly for an appliance, the appliance comprising a cabinet defining a chamber, a recirculation duct in fluid communication with the chamber, and a fan assembly operably coupled to the recirculation duct for urging a flow of air through the recirculation duct, the gas sensing assembly comprising:
  a gas sensor positioned within the cabinet for detecting a concentration of a gas within the flow of air; and
  a flow stabilization device surrounding the gas sensor for reducing pressure fluctuations in the flow of air, wherein the flow stabilization device comprises a muffler housing defining a sensing chamber and an intermediate muffler chamber, wherein the gas sensor is positioned within the sensing chamber, and wherein the muffler housing defines a muffler inlet that fluidly couples the intermediate muffler chamber to the recirculation duct and a muffler outlet that fluidly couples the intermediate muffler chamber to the sensing chamber.

14. The gas sensing assembly of claim 13, wherein the flow stabilization device comprises a porous open cell foam.

15. The gas sensing assembly of claim 13, wherein the flow stabilization device comprises a porous packing material of at least one of glass fiber, zeolite, nylon, or fluorine resin.

16. The gas sensing assembly of claim 13, wherein the flow stabilization device comprises a perforated plate or a mesh screen.

17. The gas sensing assembly of claim 13, wherein
  the flow stabilization device is a porous open cell foam positioned over an aperture of the housing.

* * * * *